No. 752,255. PATENTED FEB. 16, 1904.
E. E. PIERCE & L. W. NEWTON.
MACHINE FOR THE MANUFACTURE OF HORSESHOE NAILS.
APPLICATION FILED SEPT. 16, 1902.
NO MODEL. 4 SHEETS—SHEET 3.
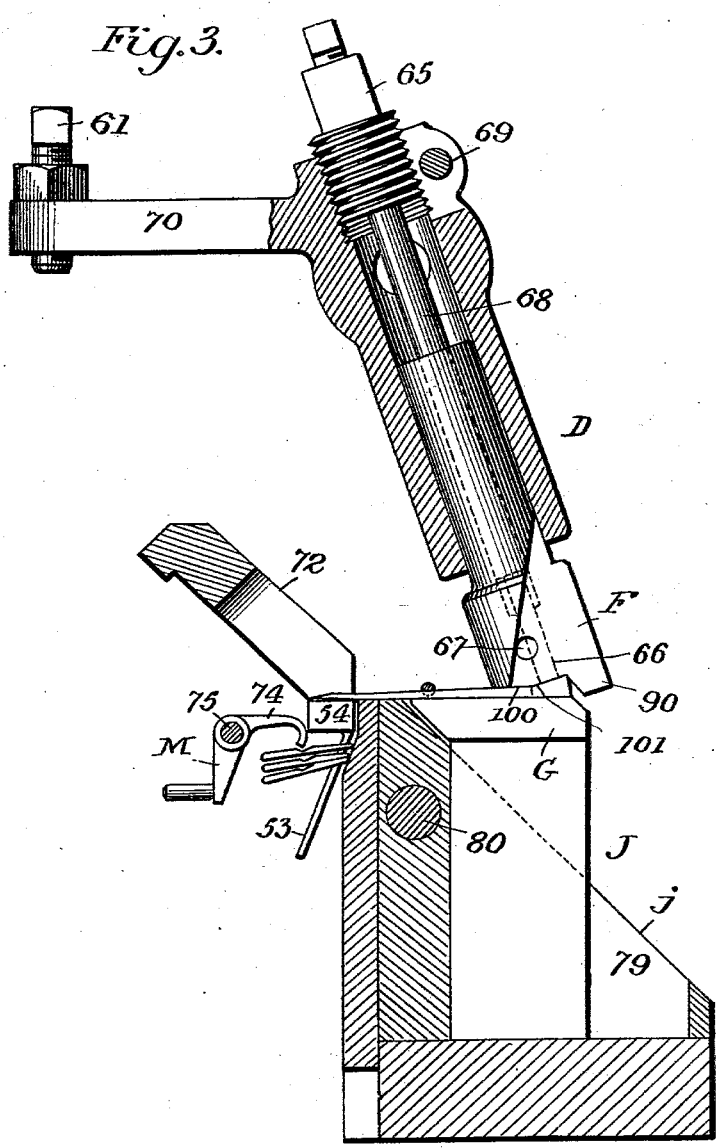
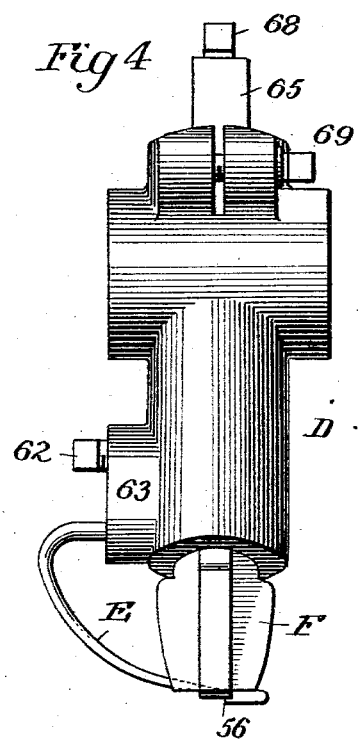
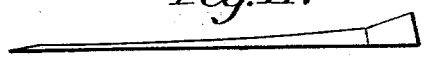
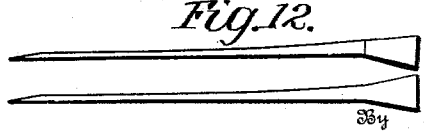

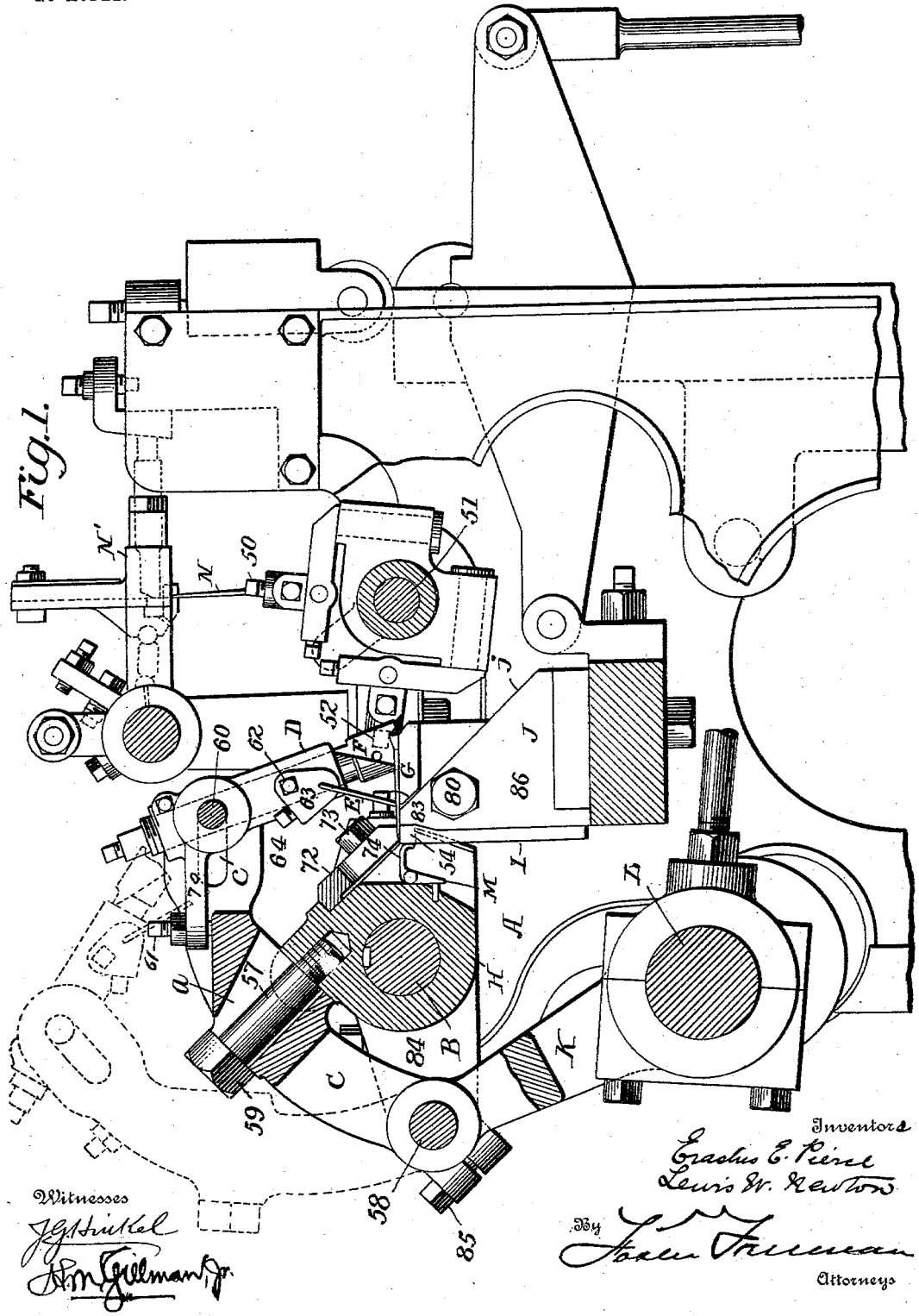

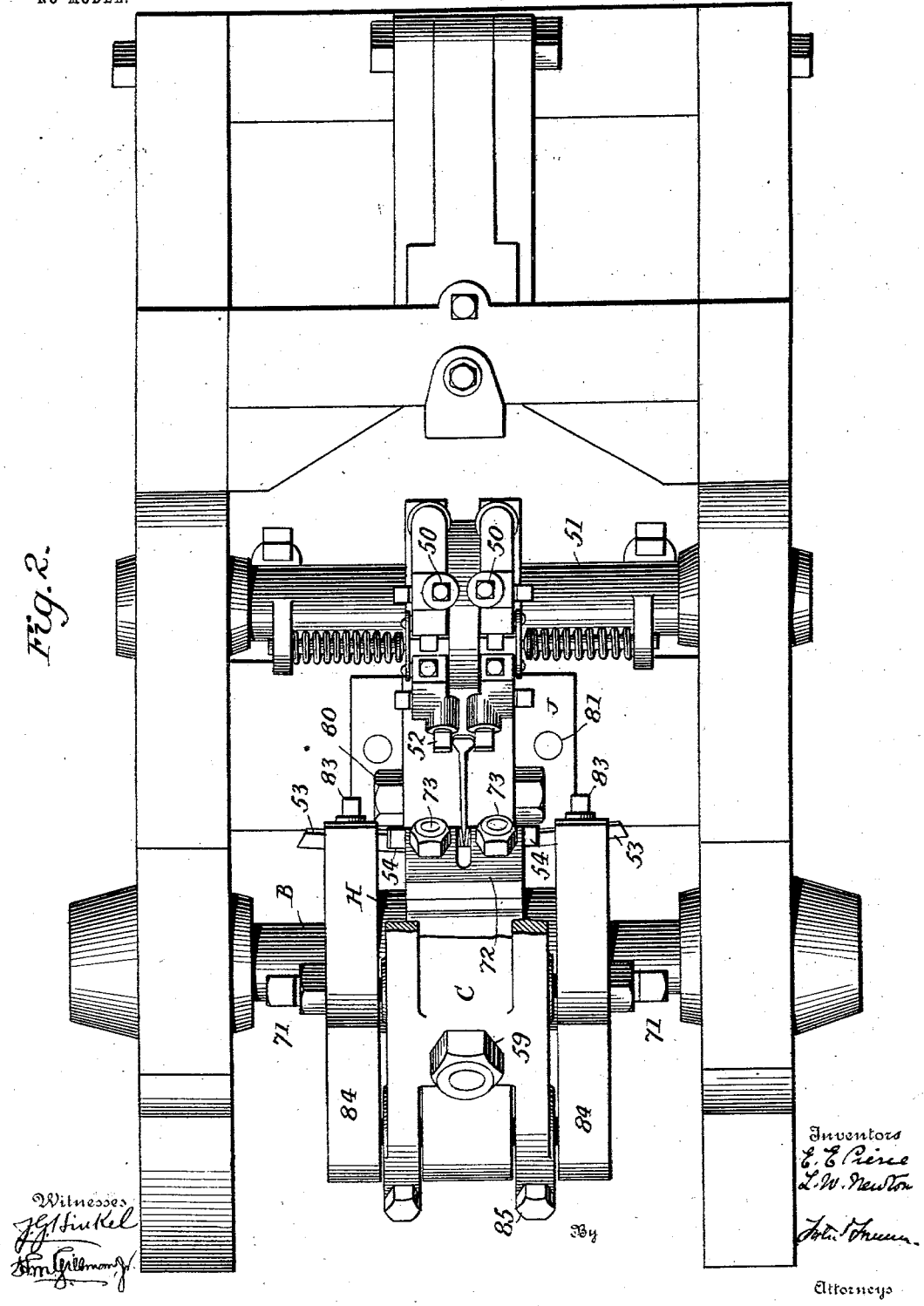

No. 752,255. PATENTED FEB. 16, 1904.
E. E. PIERCE & L. W. NEWTON.
MACHINE FOR THE MANUFACTURE OF HORSESHOE NAILS.
APPLICATION FILED SEPT. 16, 1902.
NO MODEL. 4 SHEETS—SHEET 4.
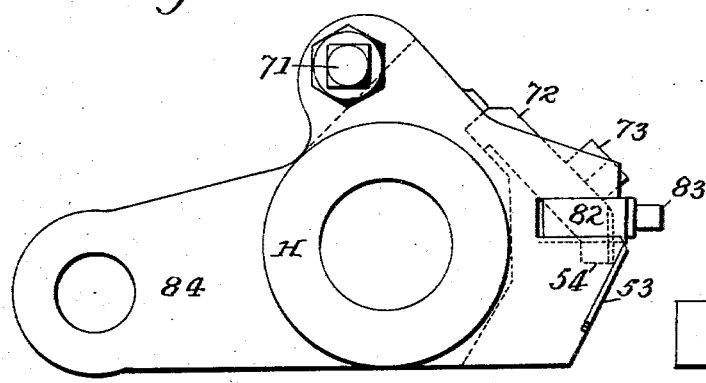
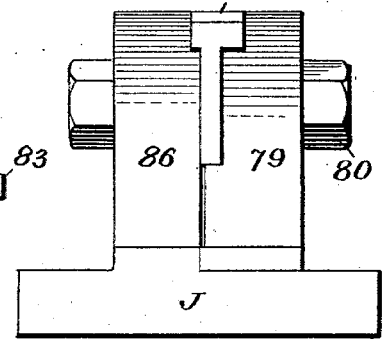
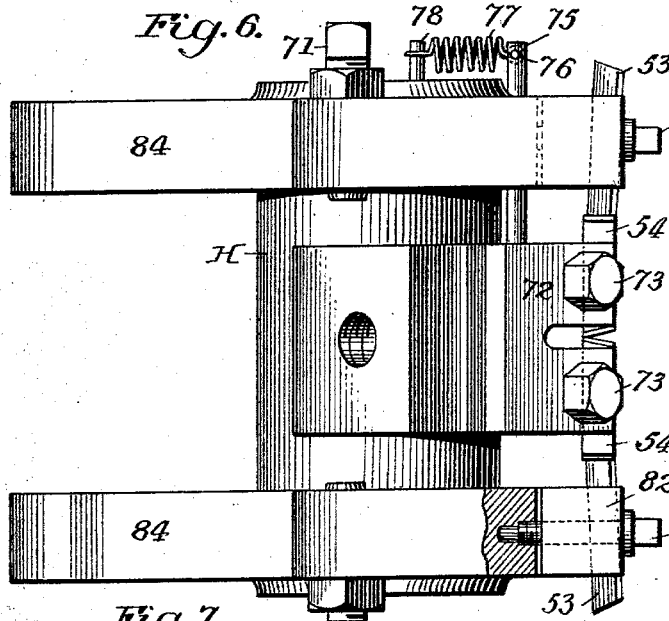
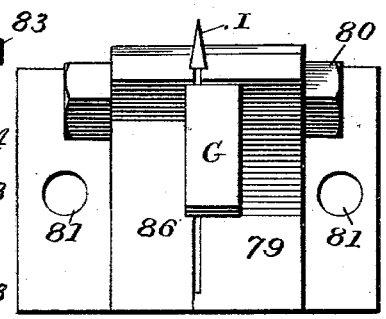
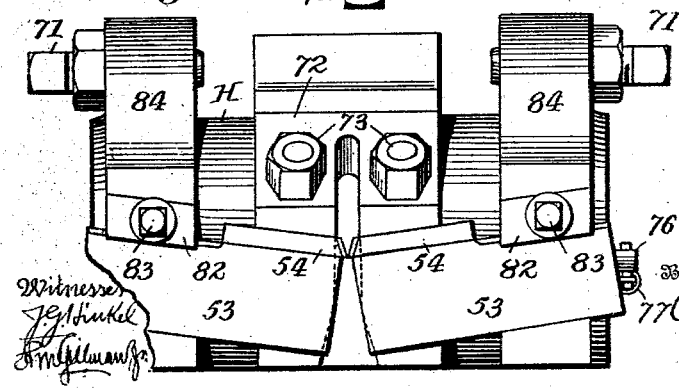
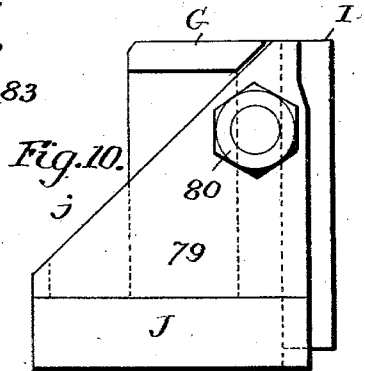
THE NORRIS PETERS CO., PHOTO-LITHO., WASHINGTON, D. C.

No. 752,255. Patented February 16, 1904.

UNITED STATES PATENT OFFICE.

ERASTUS E. PIERCE AND LEWIS W. NEWTON, OF NEW BRIGHTON, PENNSYLVANIA, ASSIGNORS TO STANDARD HORSE NAIL COMPANY, OF NEW BRIGHTON, PENNSYLVANIA, A CORPORATION OF PENNSYLVANIA.

MACHINE FOR THE MANUFACTURE OF HORSESHOE-NAILS.

SPECIFICATION forming part of Letters Patent No. 752,255, dated February 16, 1904.

Application filed September 16, 1902. Serial No. 123,647. (No model.)

*To all whom it may concern:*

Be it known that we, ERASTUS E. PIERCE and LEWIS W. NEWTON, citizens of the United States, residing at New Brighton, in the county of Beaver and State of Pennsylvania, have invented certain new and useful Improvements in Machines for the Manufacture of Horseshoe-Nails, of which the following is a specification.

Our invention relates to improvements in horseshoe-nail machines, and particularly to machines by means of which the surplus material is sheared off the blank to form the point of the nail and by which the head is given the proper "set" with respect to the blade. Our invention also provides an improved means for stamping any desired character or trade-mark upon the nail without additional handling.

It is very important that the head of a horseshoe-nail should have the correct set or inclination to the blade, for the reason that many horseshoers depend entirely upon the sense of touch in determining the proper position of the nail when being driven into the hoof to insure that the blade will curve out of the hoof. In a properly-shaped horseshoe-nail the back of the head should be substantially in the same plane as the blade, and the face of the head should be at a considerable inclination to the blade, and the bevel on the pointed end of the blade should be on the face with which the head forms an angle. It sometimes happens, however, that the set of the head is not correct with respect to the bevel on the point of the nail, and if the shoer depends only on the sense of touch and does not inspect the point before driving the nail such nail will curve inwardly instead of outwardly, with the frequent result of injuring the horse.

By the use of our invention the head of the nail is always given the correct set with respect to the bevel on the point, and in cases where by some accident prior to the indenting or beveling of the nail the wrong face of the nail is presented to the indenting-tool or the head of the nail has not been given the proper inclination to the blade such imperfections or errors will be corrected before the finished nail is discharged from the machine.

The invention will be fully described hereinafter, reference being had to the accompanying drawings, in which—

Figure 1 is a sectional view of a portion of a horseshoe-nail machine embodying our invention. Fig. 2 is a plan view. Fig. 3 is a sectional view of the shearing, setting, and branding devices detached. Fig. 4 is a front view of the setting and branding device. Fig. 5 is a side view of the cutter-head. Fig. 6 is a plan view of the same. Fig. 7 is an end view of the same. Fig. 8 is an end view of the punch-holder and punch. Fig. 9 is a plan view of the punch-holder, the punch, and the anvil; and Fig. 10 is a side view of Fig. 9. Fig. 11 is a view of a properly-shaped horseshoe-nail. Fig. 12 shows two improperly-shaped nails.

As our invention relates only to the treatment of the nail after it has been rolled and indented, we do not deem it necessary to illustrate or describe any machinery for treating the nail prior to indenting it, as all prior steps in the manufacture of the nail may be accomplished by any well-known machinery. In describing our invention, therefore, we will assume that in the process of manufacture the nail has, after being rolled, been brought to the position indicated by N by the fingers 50 and has been grasped by the indenting device N', which effects the indenting in a well-known manner—as for instance, in the manner set forth in my Letters Patent No. 379,413. The fingers 50 and also fingers 52 are mounted on a rocking shaft 51, which has an intermittent movement of about ninety degrees, and in the usual operation of the machine after the nail has been grasped by the indenting devices the fingers 50 will release it and move to the right to grasp another nail, and the fingers 52 will move up and grasp the indented nail, which the indenting devices will then release. The fingers 52 and 50 then move to the left and the indented nail is carried by the fingers 52 and laid upon the anvil G with the indentation upward. The fingers 50 meantime have carried another nail to the indenting devices, and these operations are constantly repeated, and always the indented nail will be laid on the anvil G with the indentation upward, no matter what may be the set of the head relative to the blade, and this is important in considering the advantages of our invention.

We will now proceed to describe a preferred form of mechanism for carrying our invention into effect; but we do not, however, intend to limit ourselves to the precise details of construction illustrated and described.

In the frame A of the machine a rock-shaft B is supported and carries a cutter-head H keyed or otherwise secured to it. This cutter-head H carries the cutters 54, which shear off the excess metal to complete the point of the nail. These cutters are held in position on the head by a clamp 72 and clamping-screws 73 and are supported in position to cooperate with the triangular punch I, upon which the end of the nail is supported. The punch I may be supported in any suitable manner; but preferably we provide a punch-holder (indicated by J) consisting of a standard 86, having a base provided with tapped holes 81 for the purpose of securing it to the frame of the machine, and a clamping-plate 79, which is secured to the standard by a bolt 80. The clamping-plate is grooved to receive the shank of the anvil G, and both the standard and the plate are provided with an angular recess of the proper shape to receive the punch I and to grip it tightly when the bolt 80 is secured in place. By loosening the bolt 80 either the punch I or anvil G may be removed.

The head H is also provided with nail-guides 53, which are for the purpose of centering the nail on the punch I, so that the shearing will be equal on both sides of the nail-point. The guides may be secured to the head in any suitable manner; but preferably we fit them in a dovetailed recess or notch in the head and hold them in their seats by clamping-gibs 82 and gib-screws 83. These guides are so located that they engage the nail in advance of the cutters and guide the nail until the cutters press it to the punch, after which any extraneous guiding is not necessary.

It is desirable to provide some means for pressing the excess metal sheared off by the cutters 54 away from the cutters, and while various devices may be provided for this purpose we preferably employ what we term a "scrap-clearer," and which is indicated by M, Figs. 3 and 6, and consists of a bell-crank-shaped piece 74, having a spindle 75, supported in the head H and extending out to one side thereof. The outer end of the spindle is provided with a pin 76 at right angles thereto, and a spring 77 connects this pin to an anchoring-pin 78 in the side of the head.

The head H is provided with two arms 84, provided with perforations near their outer ends for the reception of a hinge-pin 58, and what we term a "walking-beam" C is clamped to this pin between the arms 84. The beam C is bifurcated at both ends, and the legs which receive the pin 58 are split from the opening through which the pin passes out to the end and are provided with pinching-screws 85, which clamp the pin in the openings and prevent its movement endwise. Each arm 84 of the head H is provided with a set-screw 71, which are used to effect the lateral adjustment of the walking-beam C.

The legs at the free end of the walking-beam C are slotted, as indicated at c, and through these slots bolts 60 extend into threaded openings in the side of a socket D and securely clamp the latter to the beam C. This socket D carries the setting-die F, the lower end of which is adapted to engage the head and a portion of the blade adjacent to the head of the nail supported on the anvil G, and is so shaped as to give the proper set to the head when pressure is exerted by the setting-die.

The socket D is provided with a set-screw 62, which engages the stem of the setting-die F within the socket and holds it in place. To adjust the die F lengthwise of the socket, we preferably employ a hollow set-screw 65, which engages the inner end of the stem of the die and projects beyond the upper end of the socket D, and the latter is slotted at its upper end and provided with a clamping-screw 69, which is employed to prevent the slipping of the hollow set-screw 65. Projecting from the upper end of the socket D is an arm 70, through which a set-screw 61 passes, and is adapted to engage the beam C between its upper legs and by means of which the angle of inclination of the setting-die F relative to the anvil G may be adjusted to suit slight variations in the head angles of the different kinds and sizes of nails, and the slots c and bolts 60 permit adjustment of the setting-die to adapt it for use on nails of different lengths.

In order to stamp any desired character upon the nail, we preferably make the setting-die hollow and insert a branding-die 66 therein, said branding-die being in the form of a rod or bar and having on its outer end the character desired to be stamped on the nail. The die 66 may be secured in the setting-die F in any suitable manner, as by a key 67, and a long set-screw 68, extending through the hollow set-screw 65 may be employed for adjusting the branding-die lengthwise. In case it is not desired to brand or stamp the nails, the die 66 may be removed and a bar with a plain end be substituted.

The walking-beam C and the cutter-head H are coupled together by means of a stud 57, secured in the head H and extending through a slot a in the walking-beam. The outer end of the stud is threaded to receive a nut 59, which when screwed on to engage the beam C will lock the latter to the head H, so that both will move together. By removing the nut 59 the beam and the setting-die F can be swung back to the position indicated by dotted lines in Fig. 1, thereby affording ready access to the cutters 54 and guides 53 in case these parts need attention of any kind. The cutter-head H and the setting-die F receives their movement from a crank-shaft L, the crank of which is connected by a pitman K to the pin 58, said pitman being between the legs of the walking-beam C.

After the nail has been operated upon by the cutters 54 and the die F the head H and die F will move upwardly away from it, and it is then necessary to remove the finished nail from the anvil G. Various devices may be employed for this purpose; but preferably we employ a nail-ejector E, which consists of a piece of spring metal one end of which is secured in a boss 63 on the side of the socket D by a set-screw 62. The ejector E is bent or bowed and its free end extends across the anvil G in position to engage the nail between the cutters and the set. When the socket D is moved downwardly, the ejector E will be bent still more, and this will cause its free end to slide across the nail until a notch 56 in the ejector engages the nail. When the socket D moves upward, the ejector E will spring back to normal position and its free end will move transversely of the anvil G in the opposite direction, and this will result in moving the nail to one side of the anvil G, and it will drop off the anvil and slide down the incline $j$ on the punch-holder J out of the machine.

In Fig. 11 we have illustrated a properly-shaped horseshoe-nail, and in Fig. 12 we have illustrated two improperly-shaped nails, one, $x$, having the angle between the head and blade on the wrong side and the other, $y$, having an angle between the head and blade on both sides. Now assuming that either of the improperly-shaped nails was laid on the anvil G by the fingers 52, it is obvious that the pressure by the die F upon either will result in bringing it to the proper shape, because the anvil G is flat and the material of which horseshoe-nails are made is easily bent.

In the operation of the machine the parts are so arranged relatively to each other and their movements so timed that the die F will not engage the nail until after the cutters have completed the shearing, as otherwise the engagement of the die F with the nail would tend to draw it away from the cutters and twist or distort the point.

It will be observed that the setting-die F has two surfaces 100 and 101 at an angle to each other. The surface 100 engages the blade of the nail and the surface 101 the head, and the angle formed by these two surfaces is the proper angle the face of the head should have to the blade of the nail. It will also be observed that the die F has a nose 90 extending in front of and below the surface 101, and its function is to enter between the fingers 52 and open them sufficiently to release the nail.

Having described the invention, we claim—

1. In a horseshoe-nail-finishing machine, the combination of nail-blank-indenting devices, an anvil, means for conveying an indented nail-blank from said devices and laying it on the anvil with the indentation upward, and a setting-die movable to engage the upper surface of the nail-blank and impart the proper set to the head relative to the blade, substantially as set forth.

2. In a horseshoe-nail-finishing machine, the combination of nail-blank-indenting devices, an anvil, means for conveying an indented nail-blank from said devices and laying it on the anvil with the indentation upward, and a setting-die movable to engage the upper surface of the nail-blank and having two surfaces at an angle to each other to engage the head and blade respectively, substantially as set forth.

3. In a horseshoe-nail-finishing machine, the combination of nail-blank-indenting devices, an anvil, fingers to carry an indented nail-blank from said devices and lay it upon the anvil with the indentation upward, and a setting-die movable to engage the upper surface of the nail-blank, said die having two surfaces at an angle to each other to engage the head and blade of the blank respectively, and having also a nose to enter between said fingers and open them, substantially as set forth.

4. In a horseshoe-nail-finishing machine, the combination of an anvil, a setting-die movable to engage a nail-blank supported upon the anvil and impart the proper set to the head relative to the blade of said blank, and a branding-die carried by said setting-die to simultaneously brand the nail, substantially as set forth.

5. In a horseshoe-nail-finishing machine, the combination of an anvil and a shearing-punch for supporting a nail-blank, movable guides for centering said blank upon the punch, movable cutters coöperating with the punch for shearing of the surplus metal from said blank, and means for clearing away the scrap sheared off, substantially as set forth.

6. In a horseshoe-nail-finishing machine, the combination of an anvil and a shearing-punch for supporting a nail-blank, movable guides for centering said blank upon the punch, movable cutters coöperating with the punch for shearing of the surplus metal from said blank, means for clearing away the scrap sheared off, and a nail-ejector for moving the finished nail from the anvil, substantially as set forth.

7. In a horseshoe-nail-finishing machine, the combination of an anvil for supporting a nail-blank, means for removing surplus metal from the blank to form the nail-point, a movable setting-die to engage the nail-blank and hold it in place while being sheared and coöperate with the anvil to correctly set the head and blade relatively to each other, subsequent to forming the nail-point, and an ejector to remove the nail from the anvil, substantially as set forth.

8. In a horseshoe-nail-finishing machine, the combination of an anvil for supporting a nail-blank, means for removing surplus metal from the blank to form the nail-point, a movable setting-die to engage the nail-blank, hold while being sheared, and coöperate with the anvil to correctly set the head and blade relatively to each other, and means for ejecting the finished nail from the anvil, substantially as set forth.

9. In a horseshoe-nail-finishing machine, the combination of an anvil for supporting a nail-blank, means for removing surplus metal from the blank to form the nail-point, a movable setting-die to engage the nail-blank, hold while being sheared, and coöperate with the anvil to correctly set the head and blade relatively to each other, means for removing the surplus metal sheared off away from the cutters, and means for ejecting the finished nail from the anvil, substantially as described.

10. In a horseshoe-nail-finishing machine, the combination of an anvil for supporting a nail-blank, a cutter-head having cutters to operate on the nail-blank, a setting-die having a hinged connection to the cutter-head, and means for detachably locking the setting-die to the cutter-head, substantially as described.

11. In a horseshoe-nail-finishing machine, the combination of an anvil for supporting a nail-blank, an oscillating cutter-head, guides on the head for centering said blank, cutters on said head for shearing said blank, a setting-die having a hinged connection to the said head and extending over the anvil above the guides and cutters, and means for detachably locking the setting-die to the cutter-head, substantially as set forth.

In testimony whereof we have signed our names to this specification in the presence of two subscribing witnesses.

ERASTUS E. PIERCE.
LEWIS W. NEWTON.

Witnesses:
J. F. MINER,
FRED. S. MERRICK.